United States Patent [19]

Madelmont, deceased et al.

[11] 3,839,654
[45] Oct. 1, 1974

[54] GENERATOR FOR SELF-CONTAINED ELECTRICALLY TRIGGERED WEAPONS

[75] Inventors: Robert Madelmont, deceased, late of Mulhouse, France; Juliette Romann, legal representative, Tulle; Gilbert Edus, Mulhouse, both of France

[73] Assignee: Etat Francais, Paris, France

[22] Filed: Aug. 7, 1973

[21] Appl. No.: 386,282

[30] Foreign Application Priority Data

July 4, 1972 France ............................. 72.24076

[52] U.S. Cl. ...................... 310/75, 310/83, 310/84, 89/135
[51] Int. Cl. ............................................ H02k 7/06
[58] Field of Search .......... 89/135, 28, 28 C; 42/84; 310/20, 69, 75, 75 B, 75 D, 80, 83, 84, 66, 67

[56] References Cited
UNITED STATES PATENTS

| 898,848 | 9/1938 | Dodson | 310/84 X |
|---|---|---|---|
| 2,437,675 | 3/1948 | Bardin | 310/75 B |
| 2,440,282 | 4/1948 | Leghorn | 310/75 R |
| 2,480,854 | 9/1949 | Hardman | 310/75 R |
| 2,698,394 | 12/1954 | Brown | 310/83 X |
| 2,805,604 | 9/1957 | Humphrey | 89/135 |
| 3,681,631 | 8/1972 | Haener | 310/80 X |

Primary Examiner—D. F. Duggan
Attorney, Agent, or Firm—Larson, Taylor & Hinds

[57] ABSTRACT

An electrical generator for a self-contained electrically triggered weapon is provided which converts the reciprocating movement of a moving mechanical part of the weapon, e.g., a reciprocating breech member, into rotational movement of a generator rotor. A cam on the moving mechanical part engages in helical track to cause rotation thereof. This rotation is transmitted to the generator rotor through a gearing arrangement including a drive gear which drives the generator rotor during rotation of the track in a first direction, inertical forces providing for continued rotation of the generator rotor in the same direction during rotation of the track in the opposite direction.

7 Claims, 4 Drawing Figures

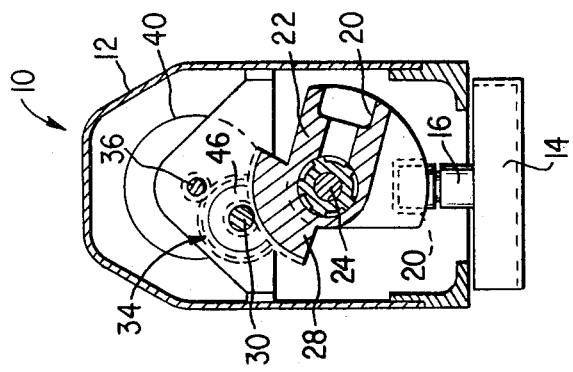
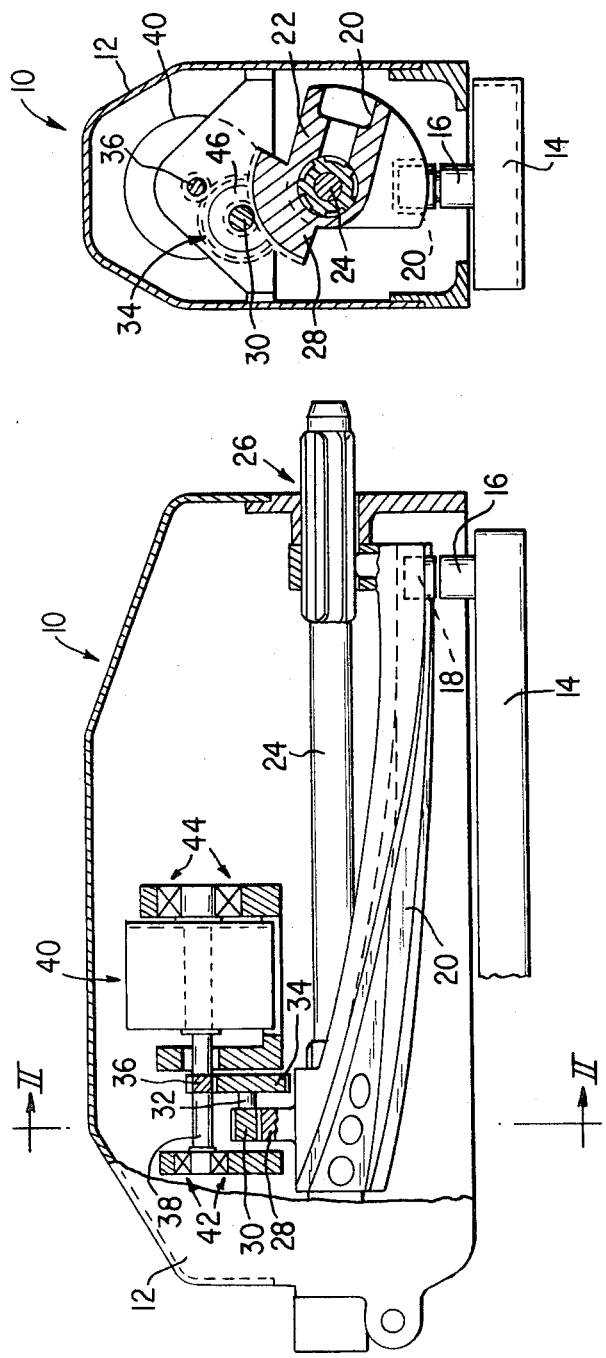

GENERATOR FOR SELF-CONTAINED ELECTRICALLY TRIGGERED WEAPONS

FIELD OF THE INVENTION

The present invention relates to an electrical generator for an electrically triggered weapon.

BACKGROUND OF THE INVENTION

In electrically triggered weapons, an external auxiliary electrical supply is provided which is generally independent of the weapon. The weapon can be made self-contained by coupling movable parts thereof to a generator for the electrical trigger. For example, a reciprocating breech member can be used to drive a magnetic core through a coil. In another approach, magnetic flux switching is utilized, a double turn coil being provided around a magnetic circuit having a movable section, coupled to the breech member, which opens or closes the magnetic circuit responsive to movement of the breech member. In yet another embodiment, piezoelectric crystals or wafers are used which are compressed upon movement of the breech member.

Such systems suffer a number of disadvantages including limitations on the triggering energy provided, relatively low operational reliability and too frequent triggering failures.

SUMMARY OF THE INVENTION

In accordance with the present invention an electrical generator for a self-contained electrically triggered weapon is provided which largely overcomes the problems of the prior art. Generally speaking, the invention involves the provision of a generator rotor which is rotatably driven by an arrangement which converts the longitudinal or translational movement of the breech member into corresponding rotational motion.

According to a preferred embodiment of the generator of the invention, the translational to rotational conversion is effected by an arrangement including a shaft, a helical track which is mounted on the shaft and in which a cam affixed to the breech member rides, and a gearing arrangement, including a free wheel or drive gear, for causing rotation of the generator rotor in the same direction during rotation of the helical track in a first direction and a second, opposite direction responsive to the reciprocating movement of the breech member. This arrangement provides the required electrical energy during the initial movement of the breech member and permits an increase in this energy, if necessary, during subsequent rounds, this increased energy being obtained during the course of further movements of the breech member.

Other features and advantages of the invention will be set forth in, or apparent from, the detailed description of the preferred embodiments thereof found hereinbelow.

BRIEF DESCRIPTION OF THE DRAWINGS

FIG. 1 is a representational, side elevational view, partially broken away and partially in section, of an electrical generator for a weapon, in accordance with the invention;

FIG. 2 is a sectional view taken along line II—II of FIG. 1;

DESCRIPTION OF THE PREFERRED EMBODIMENTS

Figure 3:
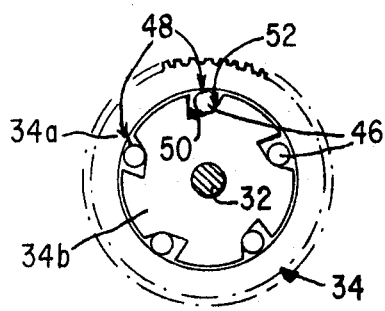
FIG. 3 is a detail of the drive wheel of FIGS. 1 and 2, showing the outer drive gear in dashed lines.

Referring to FIGS. 1 and 2, a self-contained electrical generator for a weapon (not shown) is indicated generally at 10. Generator 10 includes a housing or casing 12 which is mounted on the weapon preferably above a reciprocating breech member, a portion of which is shown at 14, parallel to the movement of the breech member. Breech member 14 includes a stop 16 to which a cam member 18 is secured. Cam member 18 engages in a helical track or groove 20 formed in a track-defining or track member 22 which is rotatably mounted on a shaft 24. Shaft 24 is, in turn, fixedly secured to housing 12 by suitable means such as indicated at 26. Thus, reciprocating movement of breech member 14 will result in rotation of track member 22 about shaft 24 first in one direction and then in the opposite direction.

Track member 22 includes a tooth sector or sector gear 28 which drives a pinion 30 mounted on a further shaft 32. A drive wheel 34 is also mounted on shaft 32 which drives a further pinion 36 mounted on the rotor shaft 38 of an electrical generator generally denoted 40. Rotor shaft 38 is mounted for rotation in bearings indicated at 42 and 44. Generator 40 is of conventional construction per se and further description thereof is thus thought unnecessary.

As indicated in FIG. 3, drive wheel 34 comprises an inner wheel 34b which is secured to shaft 32 and an outer gear wheel 34a which engages pinion 36 and is indicated in dashed lines in FIG. 3. Inner wheel 34b includes a plurality of peripheral recesses 48 equally spaced about the circumference thereof in which rollers or balls, indicated at 46, are seated. Each recess 48 includes a wedging face 50 and a bearing face 52 which prevents any deformation of a wedging face 50 by a corresponding roller 46 during driving of outer gear wheel 34a by inner wheel 9b.

With the arrangement shown in FIGS. 1 to 3 and described hereinabove, rotation in one direction of track member 22, responsive to movement of breech member 14 in a first direction, will cause rotation of generator rotor 36 in one direction. On the other hand, with rotation of track 22 in the opposite direction, responsive to movement of breech member 14 in a second, opposite direction, generator rotor 36 will continue to rotate in the same direction, through the forces of inertia, owing to the action of drive wheel 34.

Figure 4:
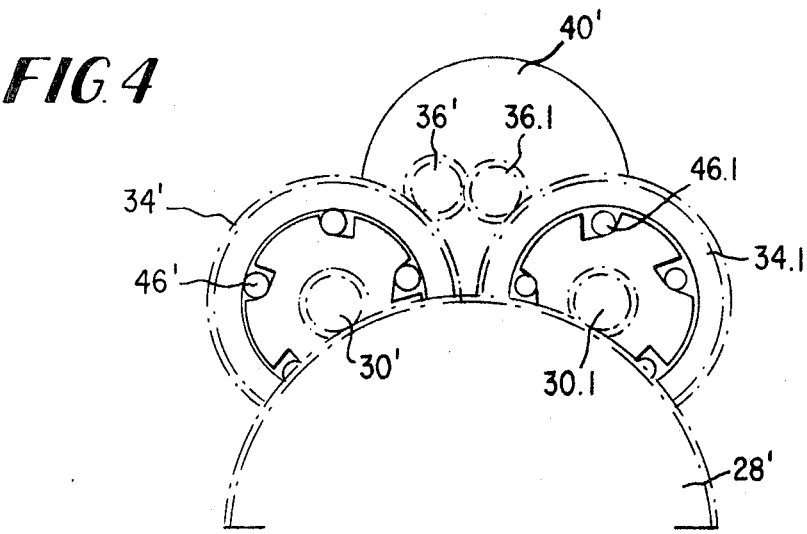
FIG. 4 is an end view of an alternate embodiment of the drive gearing arrangement of FIGS. 1 to 3.

Referring to FIG. 4, an embodiment of the drive arrangement is shown which provides driving of the generator shaft for both directions of rotation of the track member. The drive arrangement of FIG. 4 is similar to that of FIGS. 1 to 3 and like elements have been given the same numbers with primes attached. The only real difference between the embodiment of FIG. 4 and that of FIGS. 1 to 3 is that an additional drive wheel 34.1 is utilized along with associated pinions 30.1 and 36.1. Drive wheel 34.1, during translation of breech member 22 in the second, opposite direction, i.e., the direction opposite to that in which wheel 36' acts as a drive wheel, drives pinion 36 through intermediate pinion 36.1 so that a rotation is imparted to the generator rotor (not shown in FIG. 4) in the same direction as is imparted by the first drive wheel 36'.

As stated hereinabove, generator 40 can be of any conventional type. However, in a preferred embodiment, generator 40 comprises an alternating current generator and hence the system also includes conventional rectification equipment (not shown) which converts the generator output into a direct current voltage for controlling the electrical triggering (not shown). As set forth hereinabove, the present invention is a specific improvement in a conventional electrical triggering system for a weapon. The electrical triggering system chosen apart from the generator apparatus described above, can take any conventional form and hence further description of the overall system is not necessary here.

Although the invention has been described with reference to exemplary embodiments thereof, it will be understood by those skilled in the art that variations and modifications may be effected in these embodiments without departing from the scope and spirit of the invention.

What is claimed is:

1. An electrical generator for a self-contained electrically triggered weapon including a mechanical member which moves in translation, said generator including a rotor and mechanical means for converting the translational movement of the mechanical member into rotational movement of said rotor, said mechanical means comprising a shaft, means mounted on said shaft and defining a helical track for engaging a cam secured to the mechanical member so that said track defining means rotates responsive to translation of said mechanical member, a sector gear which rotates with rotation of said track defining means, and gear means including a drive gear for coupling said sector gear to the generator rotor.

2. A generator as claimed in claim 1 wherein said cam is affixed to a stop which is integral with said mechanical member, said track defining means being mounted for rotation on said shaft and said sector gear being secured to said track defining means.

3. A generator as claimed in claim 1 wherein said gearing means includes first and second oppositely acting drive gears for alternately driving said rotor in the same direction responsive to respective translational movements of the mechanical member in opposite directions.

4. A generator as claimed in claim 3 wherein said gearing arrangement further includes a first pinion mounted on said rotor and drivenly coupled to said first drive gear and a second pinion coupled to said first pinion and drivenly coupled to said second drive gear.

5. A generator as claimed in claim 1 wherein said drive gear includes a plurality recesses equally spaced about the periphery thereof for receiving a corresponding roller member therein, each said recess including a wedging face and a bearing face at an obtuse angle with respect to said wedging face.

6. A generator as claimed in claim 5 wherein said roller member comprises spherical bearing.

7. A generator as claimed in claim 5 wherein said roller member comprises a cylindrical roller.

* * * * *